United States Patent
Ignatchenko

(10) Patent No.: US 11,632,248 B2
(45) Date of Patent: *Apr. 18, 2023

(54) SYSTEMS, METHODS AND APPARATUSES FOR DEVICE ATTESTATION BASED ON SPEED OF COMPUTATION

(71) Applicant: OLogN Technologies AG, Triesen/FL (LI)

(72) Inventor: Sergey Ignatchenko, Innsbruck (AT)

(73) Assignee: OLogN Technologies AG, Triesen (LI)

( * ) Notice: Subject to any disclaimer, the term of this patent is extended or adjusted under 35 U.S.C. 154(b) by 91 days.

This patent is subject to a terminal disclaimer.

(21) Appl. No.: 17/221,576

(22) Filed: Apr. 2, 2021

(65) Prior Publication Data

US 2021/0288810 A1 Sep. 16, 2021

Related U.S. Application Data

(63) Continuation of application No. 16/240,265, filed on Jan. 4, 2019, now Pat. No. 10,972,278, which is a
(Continued)

(51) Int. Cl.
*H04L 9/32* (2006.01)
*H04L 9/40* (2022.01)
*H04W 12/61* (2021.01)

(52) U.S. Cl.
CPC .......... *H04L 9/3234* (2013.01); *H04L 63/126* (2013.01); *H04L 63/108* (2013.01); *H04L 63/1466* (2013.01); *H04W 12/61* (2021.01)

(58) Field of Classification Search
CPC ... H04L 9/3234; H04L 63/126; H04L 63/108; H04L 63/1466; H04W 12/61
(Continued)

(56) References Cited

U.S. PATENT DOCUMENTS 5,673,293 A 9/1997 Scarpa et al.
5,864,624 A 1/1999 Lukas et al.
(Continued)

FOREIGN PATENT DOCUMENTS

EP 2 071 787 A1 6/2009
WO WO 2007/029863 A1 3/2007
WO WO 2011/131745 A1 10/2011

OTHER PUBLICATIONS

U.S. Appl. No. 15/273,910, filed Sep. 23, 2016, Ignatchenko et al.
(Continued)

*Primary Examiner* — Michael S McNally
(74) *Attorney, Agent, or Firm* — Arnold & Porter Kaye Scholer

(57) ABSTRACT

The systems, methods and apparatuses described herein provide a computing device that is configured to attest itself to a communication partner. In one aspect, the computing device may comprise a communication port configured to receive an attestation request from the communication partner, and an application-specific integrated circuit (ASIC). The ASIC may be configured to receive the attestation request from the communication port. The attestation request may include a nonce generated at the communication partner. The ASIC may be further generate a verification value and send the verification value to the communication port to be transmitted back to the communication partner. The verification value may be a computation result of a predefined function taking the nonce as an initial value. In another aspect, the communication partner is configured to attest the computing device using speed of computation attestation.

22 Claims, 4 Drawing Sheets

Related U.S. Application Data continuation of application No. 14/205,194, filed on Mar. 11, 2014, now Pat. No. 10,177,915.

(60) Provisional application No. 61/792,392, filed on Mar. 15, 2013.

(58) Field of Classification Search
USPC .......................................................... 726/4
See application file for complete search history.

(56) References Cited

U.S. PATENT DOCUMENTS

| | | |
|---|---|---|
| 6,058,121 A | 5/2000 | Kim et al. |
| 6,853,616 B1 | 2/2005 | Kim et al. |
| 6,976,168 B1 | 12/2005 | Branstad et al. |
| 7,177,424 B1 | 2/2007 | Furuya et al. |
| 7,886,968 B2 | 2/2011 | Shoemaker |
| 7,926,103 B2 | 4/2011 | Aguilera et al. |
| 8,159,391 B2 | 4/2012 | Papadimitratos et al. |
| 8,559,339 B1 | 10/2013 | Talley et al. |
| 9,002,540 B2 | 4/2015 | Ledendecker |
| 9,066,202 B2 | 6/2015 | Dua et al. |
| 9,342,683 B2 | 5/2016 | Weiss et al. |
| 10,085,136 B2 | 9/2018 | Ignatchenko et al. |
| 2003/0048811 A1 | 3/2003 | Robie, Jr et al. |
| 2004/0019785 A1 | 1/2004 | Hawkes et al. |
| 2004/0039946 A1 | 2/2004 | Smith et al. |
| 2004/0039966 A1* | 2/2004 | Petsinger ............ G06F 11/261 714/28 |
| 2004/0193918 A1 | 9/2004 | Green et al. |
| 2004/0250074 A1 | 12/2004 | Kilian-Kehr |
| 2004/0264372 A1 | 12/2004 | Huang |
| 2005/0172333 A1 | 8/2005 | Kim |
| 2005/0273608 A1 | 12/2005 | Kamperman |
| 2006/0044108 A1 | 3/2006 | Nowottnick |
| 2006/0239453 A1 | 10/2006 | Halpern |
| 2006/0248340 A1 | 11/2006 | Lee et al. |
| 2007/0058559 A1 | 3/2007 | Xu |
| 2007/0091359 A1 | 4/2007 | Suzuki et al. |
| 2007/0217343 A1 | 9/2007 | Znamova |
| 2007/0259693 A1 | 11/2007 | Brunel et al. |
| 2007/0261124 A1* | 11/2007 | Centonze ............ G06F 21/6227 726/27 |
| 2007/0294645 A1 | 12/2007 | Medvinsky et al. |
| 2007/0300070 A1 | 12/2007 | Shen-Orr |
| 2008/0013640 A1 | 1/2008 | Lu et al. |
| 2008/0031136 A1 | 2/2008 | Gavette et al. |
| 2008/0157929 A1 | 7/2008 | Hilgers et al. |
| 2008/0281600 A1 | 11/2008 | Kuppuswamy et al. |
| 2009/0055550 A1* | 2/2009 | Way ........................ H04L 47/10 709/233 |
| 2009/0225669 A1 | 9/2009 | Qin et al. |
| 2009/0275352 A1 | 11/2009 | Kim et al. |
| 2009/0319656 A1 | 12/2009 | Yang et al. |
| 2010/0008252 A1 | 1/2010 | Alve |
| 2010/0269156 A1 | 10/2010 | Hohlfeld et al. |
| 2011/0078549 A1 | 3/2011 | Thueringer et al. |
| 2011/0170532 A1 | 7/2011 | Tchepnda et al. |
| 2011/0202766 A1 | 8/2011 | Lerner |
| 2011/0302653 A1 | 12/2011 | Frantz et al. |
| 2012/0023568 A1 | 1/2012 | Cha et al. |
| 2012/0057702 A1 | 3/2012 | Minematsu |
| 2012/0134687 A1 | 5/2012 | Jones et al. |
| 2012/0151210 A1 | 6/2012 | Perez |
| 2012/0246490 A1 | 9/2012 | Unagami et al. |
| 2012/0307712 A1 | 12/2012 | Watanabe |
| 2013/0010617 A1 | 1/2013 | Chen et al. |
| 2013/0050080 A1 | 2/2013 | Dahl et al. |
| 2013/0102252 A1 | 4/2013 | Rasmussen |
| 2013/0116964 A1 | 5/2013 | Van Roermund et al. |
| 2013/0198797 A1 | 8/2013 | Raghuram et al. |
| 2013/0208893 A1 | 8/2013 | Shablygin et al. |
| 2013/0212704 A1 | 8/2013 | Shablygin et al. |
| 2013/0251152 A1 | 9/2013 | Roelse et al. |
| 2013/0276064 A1 | 10/2013 | Ignatchenko |
| 2013/0276081 A1 | 10/2013 | Weiss et al. |
| 2013/0283361 A1 | 10/2013 | Rao et al. |
| 2013/0287011 A1 | 10/2013 | Zhao |
| 2014/0074719 A1 | 3/2014 | Gressel et al. |
| 2014/0082696 A1 | 3/2014 | Danev et al. |
| 2014/0214687 A1 | 7/2014 | Huxham |
| 2014/0223553 A1 | 8/2014 | Gupta et al. |
| 2014/0274111 A1 | 9/2014 | Edge et al. |
| 2014/0282875 A1 | 9/2014 | Ignatchenko et al. |
| 2014/0282906 A1 | 9/2014 | Ignatchenko et al. |
| 2014/0282907 A1 | 9/2014 | Ignatchenko et al. |
| 2014/0282947 A1 | 9/2014 | Ignatchenko et al. |
| 2014/0304798 A1 | 10/2014 | Iyengar et al. |
| 2014/0334466 A1 | 11/2014 | Ignatchenko et al. |
| 2015/0082427 A1 | 3/2015 | Ivanchykhin et al. |
| 2015/0244685 A1 | 8/2015 | Shah et al. |
| 2017/0078263 A1 | 3/2017 | Ignatchenko et al. |
| 2017/0099569 A1 | 4/2017 | Ignatchenko et al. |
| 2018/0351933 A1 | 12/2018 | Ignatchenko |

OTHER PUBLICATIONS

U.S. Appl. No. 15/274,290, filed Sep. 23, 2016, Ignatchenko et al.
U.S. Appl. No. 61/623,861, filed Apr. 13, 2012, Ignatchenko.
U.S. Appl. No. 61/792,996, filed Mar. 15, 2013, Ignatchenko et al.
U.S. Appl. No. 61/825,376, filed May 20, 2013, Ignatchenko et al.
"Information technology—Identification cards—Integrated circuit(s) cards with contacts—Part 3: Electronic signals and transmission protocols," ISO/IED 7816-3:1997/PDAM-2, ISO/IEC, 16 pgs. (2002).
Anderson, "Security Engineering: A Guide to Building Dependable Distributed Systems," Protocols, Chapter 2, pp. 13-33 (2008) <www.cl.cam.ac.uk/~rja14/Papers/SE-02.pdf>.
Bahr et al., "Minimizing Trilateration Errors in the Presence of Uncertain Landmark Positions," *EMCR*, pp. 1-6 (2007).
Brands et al., "Distance-Bounding Protocols," Pro. Advances in Cryptology (EUROCRYPT\'93). pp. 344-359 (1994) <http://citeseerx.ist.psu.edu/viewdoc/download?doi=10.1.1.51.6437&rep=rep1&type=pdf>.
Capkun et al., "Secure positioning of wireless devices with application to sensor networks," INFOCOM 2005, 24th Annual Joint Conference of the IEEE Computer and Communications Societies, Proceedings IEEE, 3:1917-1928 (2005).
Clulow et al., "So Near and Yet So Far: Distance-Bounding Attacks in Wireless Networks," ESAS' 2006 Proceedings of the Third European Conference on Security and Privacy in Ad-Hoc and Sensor Networks, pp. 83-97 (2006).
Cremers et al., "Distance Hijacking Attacks on Distance Bounding Protocols," ETH Zurich, Institute of Information Security, Switzerland, pp. 1-35 (2012) <http://eprint.iacr.org/2011/129.pdf>.
Francis et al., "Practical Relay Attack on Contactles Transactions by Using NFC Mobile Phones," The 2012 Workshop on RFID and IoT Security (RFIDsec2012 Asia), Editors / Nai-Wei Lo; Yingjiu Li., IOS Press, 8:21-32 (2012).
Hancke et al., "Attacks on Time-of-Flight Distance Bounding Channels," Proceedings of 1st ACM Conference on Wireless Network Security, pp. 194-202 (2008).
Hancke et al., "Security of Proximity Identification Systems," Technical Report No. 752, University of Cambridge Computer Laboratory, pp. 1-161 (2009).
International Search Report and Written Opinion dated Aug. 7, 2014, as received in International Application No. PCT/IB2014/059542.
International Search Report and Written Opinion dated Aug. 7, 2014, as received in International Application No. PCT/IB2014/061347.
International Search Report and Written Opinion dated Jan. 8, 2015, as received in International Application No. PCT/IB2014/064606.
International Search Report and Written Opinion dated Jul. 7, 2014, as received in International Application No. PCT/IB2014/059537.
Jung, "SSL/TLS," CS 686 Special Topics in Computer Science: Privacy and Security, Department of Computer Science, University

(56) References Cited

OTHER PUBLICATIONS of San Francisico, pp. 1-18 (2010) <http://www.cs.usfca.edu/~ejung/courses/686/lectures/10SSL.pdf>.

Man-in-the-middle attack, n.d., Web, Oct. 27, 2015, Wiki: <http://en.wikipedia.org/wiki/Mafia_Fraud_Attack>.

Meadows et al., "Distance Bounding Protocols: Authentication Logic Analysis and Collusion Attacks," *Advances in Information Security*, 30:279-298 (2007).

Singelee et al., "Location Verification using Secure Distance Bounding Protocols," Proc. IEEE International Conference Mobile Ad hoc and Sensor Systems, pp. 840-846 (2005).

Thorbjornsen et al., "Radio Frequency (RF) Time-of-Flight Ranging for Wireless Sensor Networks," *Meas. Sci. Technol.*, 21(3):1-22 (2010) <http://eprints.soton.ac.uk/268352/1/rf_time-of-flight_ranging.pdf>.

Yang et al., "Quality of Trilateration: Confidence based Iterative Localization," *IEEE Transactions on Parallel and Distributed Systems*, 21(5):631-640 (2010).

Yun et al., "On Protecting Integrity and Confidentially of Crypptographic File System for Outsourced Storage," *CCSW '09: Proceedings of the 2009 ACM Workshop on Cloud Computing Security*, 67-76 (2009).

\* cited by examiner

SYSTEMS, METHODS AND APPARATUSES FOR DEVICE ATTESTATION BASED ON SPEED OF COMPUTATION

RELATED APPLICATIONS

This application is a continuation application of U.S. application Ser. No. 16/240,265 (the '265 application), entitled "Systems, Methods and Apparatuses for Device Attestation Based on Speed of Computation," filed Jan. 4, 2019, which is a continuation application of U.S. application Ser. No. 14/205,194 (the '194 application), entitled "Systems, Methods and Apparatuses for Device Attestation Based on Speed of Computation," filed Mar. 11, 2014, which claims priority to U.S. Provisional Applications No. 61/792,392 (the '392 application) entitled "Systems, Methods and Apparatuses for Device Attestation Based on Speed of Computation," filed Mar. 15, 2013. The content of the '265, '194, and the '392 applications are incorporated herein by reference in their entirety.

FIELD OF THE DISCLOSURE

The systems, methods and apparatuses described herein relate to the security of data communication between electronic devices, and in particular, ensuring that a computing device with which a connection is established is a trusted and secure device.

BACKGROUND

Device attestation provides assurance that a physical device such as a computer, smartphone or tablet, is a trusted and secure device. In conventional device attestation, each device is given a unique private key, which is then attested one way or another (usually by involving a third party). Unfortunately, in many cases, this unique private key (and/or associated public key cryptography) may be prohibitively expensive to deploy and in many other cases, the "third party" requirement becomes inconvenient. In some other device attestations known in the art (such as High-bandwidth Digital Content Protection (HDCP)), attestation is based on one single key common for all devices, and as soon as this single key is extracted (and potentially published), such attestation becomes insecure.

In addition, conventional attestation methods (based on device private key) can be circumvented by extracting the private key from the device and running a software emulator using this extracted private key.

Therefore, there is a need in the art for device attestation that eliminates the private device key and the third party attestation service, while avoiding relying on the single shared key. Additionally, there is a need for device attestation that can complement the conventional attestation methods to prevent an attacker from using purely software emulators even if the private key of the device has been extracted by the attacker.

DETAILED DESCRIPTION

Figure 1:
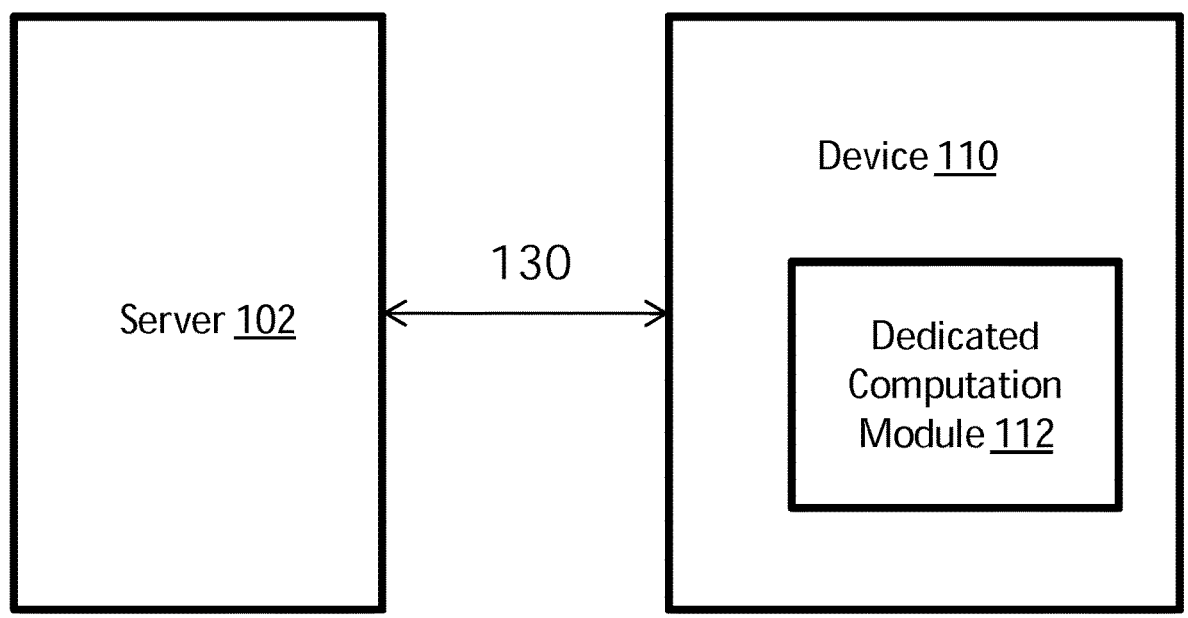
FIG. 1 is a block diagram of an exemplary system according to the present disclosure.

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure provides systems, methods and apparatuses for secure data communication between electronic devices, and in particular, ensuring the communication is between intended and/or verified devices. In certain aspects, a method according to the present disclosure may comprise generating a message, sending the generated message to a communication partner and starting to count time. The message may comprise computation parameters for computation to be performed at the communication partner. The method may further comprise receiving a value returned from the communication partner, determining whether the value is returned within a predefined or predetermined time threshold, and determining whether the received value is an expected value. The predefined or predetermined time threshold may be selected to ensure that the computation is performed by a dedicated computation module at the communication partner. If both tests succeed, the method may determine that the communication partner is a trusted device. If either test fails, the method may determine that the communication partner is not a trusted device.

In other aspects, a method according to the present disclosure may comprise determining the time needed for round-trip data transmission between two electronic devices. The round-trip data transmission may include transmitting data to a communication partner and receiving an echo from the communication partner. The method may further comprise selecting computation parameters based on the determined time, generating a message that includes the parameters, sending the generated message to a communication partner and starting to count time. The computation parameters may be input parameters for computation to be performed at the communication partner. The method may further comprise receiving a value returned from the communication partner, determining whether the value is returned within a predefined or predetermined time threshold, and determining whether the received value is an expected value. The time threshold may be selected to ensure that the computation is performed by a dedicated computation module at the communication partner. If both tests succeed, the method may determine that the communication partner is a trusted device. If either test fails, the method may determine that the communication partner is not a trusted device.

Without being limiting, FIG. 1 shows an exemplary system 100 according to the present disclosure. The system 100 may comprise a server 102 and a computing device 110. The server 102 may be coupled to the computing device 110 by a communication link 130. The server 102 may be a computing device that comprises one or more computer processors and may want to ensure that the computing device 110 is a trusted device. The communication link 130 may be of any type, including, for example wired (e.g., USB, Ethernet, IEEE 1394, etc.), wireless (e.g., Near Field Communication, WiFi, Bluetooth, etc.), direct or through the Internet, etc.

The computing device 110 may comprise a specially designed and built dedicated computation module 112 for performing a predefined function F. The function F may be selected from a group such that performance of the function F on a commonly available general purpose computing device (e.g., a general-purpose CPU, a GPU or field-programmable gate array (FPGA) integrated circuits) may take a much longer time (for example, at least twice or more) than it would on the dedicated computation module 112.

In one non-limiting embodiment, the function F may be selected such that its computation may be sequential (e.g., a series of computation steps in a sequence). That is, the computation result cannot be obtained faster by splitting the computation process into parts and performing one or more parts in parallel. For example, using an initial value $V_0$ as an input parameter, a hash function H may be computed to obtain value $V_1$ (e.g., $V_1=H(V_0)$). The hash function may be any suitable hash function such as, for example, SHA-0, SHA-1, or SHA-2. Then the hash function H may be applied to the value $V_1$ to obtain $V_2$ (e.g., $V_2=H(V_1)$). Such a process may be repeated N times (wherein N may be any integer greater than one) to obtain a resulting value $V_N$, wherein $V_N=H(V_{N-1})$. The function F in such an embodiment may be the entire process of calculating $V_N$ from $V_0$. Because getting the result of each step requires a result of the previous step, the computation of the function F may be considered sequential.

In another non-limiting embodiment, a symmetric encryption algorithm E may be used in calculating a sequential function F. The symmetric encryption algorithm E may be any suitable symmetric encryption algorithm such as, for example, the Advanced Encryption Standard (AES) algorithm In such an embodiment, the server 102 may send to the computing device 110 two pieces of data, an encryption key K and a value $V_0$. The computing device 110 may use the encryption key K and the value $V_0$ as the parameters for the symmetric encryption algorithm E to obtain a value $V_1$ (e.g., $V_1=E(K,V_0)$. $V_2$ may be calculated by using the encryption key K and $V_1$ as the parameters for the encryption algorithm E. The process may similarly be repeated N times (wherein N is any integer greater than 1) to obtain $V_N$, whereby $V_N=E(K, V_{N-1})$. That is, the symmetric encryption key K sent by the server 102 may be repeatedly used for the encryption calculation but each time encrypting a previous encryption result (with the exception of the first time that uses the initial value sent by the server 102).

In some embodiments, the initial value $V_o$ may be a number that is hard to predict. For example, it may be a randomly generated large number.

The dedicated computation module 112 may be, for example, an Application-Specific Integrated Circuit (ASIC) favoring speed of processing or any other dedicated hardware. For example, an ASIC implementation may be approximately a few times faster than a corresponding field programmable gate arrays (FPGAs) implementation. The ASIC (or any other dedicated hardware) implementation may also be much faster than software emulations using the combinations of general purpose CPUs and/or graphical processing units (GPUs). It is known in the art that dedicated hardware (including ASIC) implementations tend to be significantly faster (such as 10 times faster) than FPGA counterparts. It is further known in the art that dedicated hardware (including ASIC) implementations tend to be significantly faster than CPU/GPU implementations; for example, when INTEL has introduced hardware-based support for Advanced Encryption Standard (AES) Instruction Set (as hardware-supported AES-NI instructions), it improved performance of AES algorithm by approximately 3 to 10 times compared to implementations without AES-NI.

In some embodiments, the dedicated computation module 112 may be implemented as a special instruction for a CPU (not shown) that runs on the device 110. In this case, however, access to this special instruction may be restricted only to programs that perform attestation of this specific device (for example, such programs may be signed by a trusted third party), and only as a part of an attestation protocol (for example, as described below with respect to FIG. 2). Allowing such a special instruction to be used in an indiscriminate way may allow this special instruction to be used in processing requests intended for other devices, which may compromise the attestation schema. Therefore, in some embodiments, using non-restricted special instructions (such as AES-NI) for attestation described in present embodiment, may be inadvisable.

In some embodiments, the function F may be selected such that the amount of work necessary for its computation depends on its parameters. For example, in the above examples, the number of rounds N may be a variable with its value generated at the server 102, and communicated from the server 102 to the device 110. In other words, both N and V are parameters of the function F to be sent from the server 102 to the computing device 110. The greater the number N, the more rounds that need to be calculated and, therefore, the greater the amount of computation work that needs to be performed. Further, in some embodiments, the function F may be selected such that to start its computation all bits of the input parameter $V_0$ are necessary (thus preventing the start of calculations before the entire value $V_0$ is received at the device 110), and all the bits constituting the output of the function F are obtained simultaneously (thus preventing an attacker or malicious device from guessing the first several bits and using the time saving in computing the remaining bits).

Figure 2:
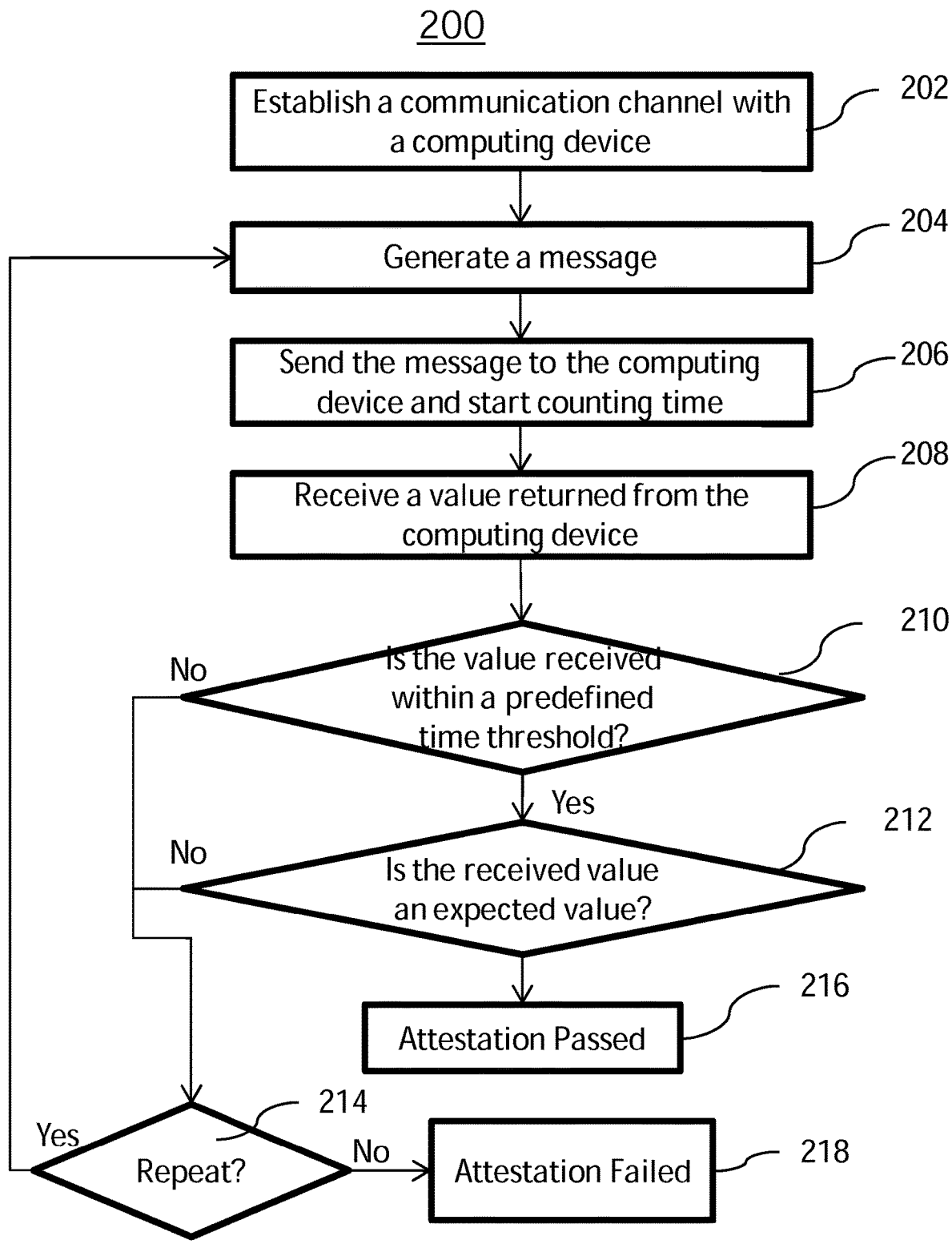
FIG. 2 is a flow diagram illustrating an exemplary process for attesting a communication partner according to the present disclosure.

FIG. 2 illustrates an exemplary process 200 that may be implemented by the server 102 to determine whether the computing device 110 is a trusted and secure device. The process 200 may start at block 202, at which the computing device 110 and the server 102 may establish a communication channel (such as, for example, a TCP channel) over the communication link 130 to communicate data. Details of establishing such a communication channel may vary, in particular, such details may depend on the particular type of communication link 130 and are well-known to those with ordinary skill in the art. In some embodiments, the communication channel may be a secure channel, such as a secure socket layer or transport layer security (SSL/TLS) channel, established over the communication link 130.

The process 200 may proceed to block 204, at which a message may be generated. The message may include parameters that may be used by the dedicated computation module 112 of the device 110 to calculate the function F. For example, the server 102 may use a random number generator (for example, cryptographically safe random number generator) to generate a nonce as the initial value $V_0$. Optionally, a variable N may also be generated as another parameter to indicate the number of iterations to be performed by the computing device 110. The nonce ($V_0$), and optionally the variable N, may be parameters to be included in the generated message. At block 206, the generated message may be sent to the computing device 110 and the server 102 may start to count the time from the moment the nonce is sent (e.g., by using a counter or a clock).

At block 208, a value may be received by the server 102. The value may be a verification value generated by the other party to the communication (e.g., the computing device 110). In an embodiment, the computing device 110 may receive the nonce, and pass it to the dedicated computation module 112 to compute a predetermined function F based on the value of the nonce and send the computed value back to the server 102 as the verification value. As described above, in some embodiments the function F may be a hash function H or an encryption function E to be performed sequentially a number of times (optionally, the variable N may also be received along with the nonce).

Then at block 210, the time duration T between the nonce being sent and the verification value being received is compared to a predefined time threshold $T_{th}$. In embodiments in which the predetermined function F starts computation only after receiving the last bit of the nonce $V_0$ and all the bits constituting the output of the function are obtained simultaneously, the time duration T between sending the nonce and receiving the verification value may be measured as the time between sending the last bit of the nonce and receiving the first bit of the verification value.

The time threshold $T_{th}$ may be selected as a sum of reasonably expected times necessary for (i) transmitting the nonce from the server 102 to the computing device 110, (ii) calculating the value of the function F by the terminal 102, and (iii) transmitting the calculated value back to the device 110. In some embodiments (for example, if server 102 and device 110 are physically close and no Internet is involved in communications) such a time threshold $T_{th}$ can be in microsecond or even in nanosecond range, although it is to be understood that $T_{th}$ may be any appropriate duration. In one embodiment, for example, it may be known in advance, that using a particular type of communication channel, it may take no more than 20 microseconds (μs) for data transmission from one device to another, and 50 microseconds for computing the function F using the dedicated computation module 112. In this case, the time threshold $T_{th}$ may be selected as: 20 μs (from server to client)+50 μs (for computations)+20 μs (for transmitting the result back)=90 μs.

If the amount of time T to receive the verification value is greater than the time threshold $T_{th}$, then the server 102 may assume that on the other end of the communication link 130 is a device incapable of fast computations of function F, and therefore, not equipped with a dedicated computation module 112 and, correspondingly, not trusted. In such a case, in some embodiments, the process 200 may proceed to the decision block 214, at which the server 102 may optionally decide to repeat blocks 204 through 210 to ensure that the delay is not due to occasional communication problems. In some embodiments, the number of such repetitions may be limited (for example, to 3 to 5).

If the time check at block 210 passes successfully, then, at block 212, the received value may be compared to an expected value. For example, the server 102 may compare the received verification value to a value of the predetermined function F calculated by the server 102 itself. Such verification may be done by either a module (not shown) similar to dedicated computation module 112, or using a general-purpose CPU or other means. It should be noted that the server's performance of the predetermined function F in order to verify the verification value received from the device 110 is not time sensitive. In other words, it is not necessary that the server 102 performs the predetermined function F as fast as the device 110 and, therefore, the server 102 may perform the predetermined function F on a general purpose computer or other computation device (i.e., one that is slower than the dedicated computation module 112) if desired. In some embodiments, it may make sense to perform computations of the function F on a GPU (not shown) within the server 102. While each single computation on the GPU may be slower than that on the computation module 112, the GPU may have a large number of cores (for example, 1500 cores), which will allow the server 102 to perform attestation of a significant number of devices 110 simultaneously.

If both checks at blocks 210 and 212 pass, at block 216, the process 200 may determine that the attestation has passed. If either the time check at block 210 or the value check at block 212 fails, the process 200 may determine at block 218 that the attestation has failed. For example, if the time check at block 210 or the value check at block 212 fails, the server 102 may determine that the computing device 110 may be a computing device that has no dedicated computation module 112 and, thus, is not a trusted device.

Successful passage of the attestation may be interpreted as "there is an attested device on the other side of the communication channel established in block 202." In embodiments where the communication is over the Internet (or otherwise unprotected), it may be beneficial to have the communication channel(s) to be SSL/TLS channel(s).

In some embodiments, an apparatus (e.g., the server 102 and computing device 110) according to an exemplary embodiment of the present disclosure may have secure zones to handle secure communications. Examples of such apparatuses may include Trusted Platform Module (TPM) Security Devices, and electronic devices with a secure zone to handle secure communication, such as, encryption and decryption tasks. An exemplary electronic device with such a secure zone is described in U.S. Provisional Patent Application No. 61/623,861, entitled "Secure Zone for Digital Communications," and filed on Apr. 13, 2012, the entirety of which is incorporated herein by reference. In some cases, the dedicated computation module 112 may be implemented as a part of a secure zone.

Figure 3:
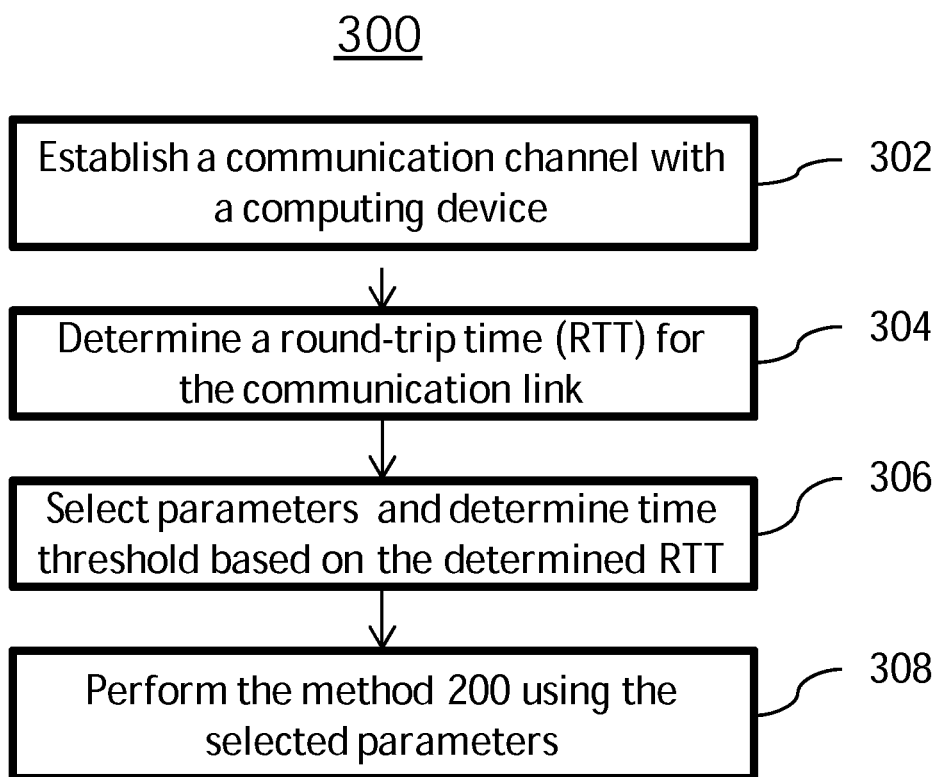
FIG. 3 is a flow diagram illustrating another exemplary process for attesting a communication partner according to the present disclosure.

FIG. 3 illustrates another exemplary process 300 according to the present disclosure. The process 300 may be a modified version of the process 200 where the communication link 130 may provide different transmission times depending on a number of factors, for example, the distance between the server 102 and computing device 110, current network conditions, etc. Uncertain network conditions may occur, for example, when the communication link 130 is the Internet. In such cases, the function F may be selected such that the computation time using the dedicated computation module 112 may depend on parameters for the function F.

The process 300 may start at block 302, at which the computing device 110 and the server 102 may establish a communication channel (e.g., over the communication link 103) to communicate data. Such communication channel may be similar to the communication channel established in block 202 described above with respect to FIG. 2.

Then the process 300 may proceed to block 304, at which a round-trip time (RTT) for the communication link 130 may be determined. The RTT may be obtained, for example, by transmitting a request from the server 102 to the computing device 110 and receiving a reply to the request from the computing device 110. Other ways of determining the RTT, depending on the nature of the communication link 130, are also possible. For example, if the communication link 130 is the Internet, standard Internet Control Message Protocol (ICMP) echo request/echo response may be used for this purpose.

At block 306, the server 102 may select parameters for the function F based on the determined RTT. For example, assuming the amount of time necessary for computation using the dedicated computation module 112 may be represented as $T_{dedicated}$, the minimum amount of time necessary for such computation using a non-dedicated computation module may be represented as $T_{non-dedicated}$, then the computation parameters (e.g., the number of iterations N) for the function F may be selected such that $T_{dedicated}-RTT<T_{non-dedicated}$ may be achieved.

For example, assuming that $T_{dedicated}=N*T_d$ (where N is the number of rounds, and $T_d$ is a constant representing the time necessary for performing a single round of computations), and $T_{non-dedicated} \geq T_{dedicated}*2$ (i.e., all non-dedicated devices are at least twice slower than the dedicated device), then to satisfy the condition above, N may be greater than $RTT/T_d$. With such a value of N, $T_{non-dedicated}-T_{dedicated} RTT)>T_{dedicated}*2-(T_{dedicated}+RTT)=T_{dedicated}-RTT=N*T_d-RTT>RTT/T_d*T_d-RTT=0$, and therefore, $T_{non-dedicated}>T_{dedicated}|RTT)$ as desired.

It should be noted that, if an emulator (without the dedicated computing module 112) is running at the computing device 110, the overall response time (e.g., the data transmission time plus the computation time) from the emulator should be greater than the time necessary for computations using a dedicated computation module 112 plus the time necessary for data transmission, and thus, such an emulator will be recognized as non-trusted. In some situations, however, a malicious (or non-trusted) client device may try to trick the server 102 at block 304 such that the server 102 may determine an inaccurate RTT. For example, a malicious device at the place of the computing device 110 may intentionally delay the echo, such that the server 102 may determine an RTT greater than the actual time needed. In this case, the process 300 may still guarantee that if block 216 is reached, the attestation is successful and a device with a dedicated computation module 112 is on the other side of the communication channel. An attacker manipulating the RTT can achieve at most either failing attestation of a valid device, or increasing the amount of work performed by both server 102 and dedicated communication module 112 for attestation purposes.

For example, if according to the determination done at block 304, the RTT is 1 second, and assuming the fastest method of computing the function F using a non-dedicated computation module requires more than twice the amount of the time required by the dedicated computation module 112, then to assure that $T_{dedicated}+RTT<T_{non-dedicated}$ the computation parameters may be selected such that the necessary time to compute the function F using dedicated computation module 112 would be at least 1 second. If a (correct) result is returned in 2 seconds (e.g., 1 second (for data transmission)+1 second (for computations)), it may be assumed that such computations could not have been done using a non-dedicated computation module (which requires at least twice the amount of time to perform the function F compared to the dedicated computation module). Accordingly, the computation within the threshold time $T_{th}$ may only have been performed by a client device 110 with a dedicated computation module 112 and, therefore, may be considered as properly attested.

If a malicious device would delay the echo such that, at block 304, the server 102 may (incorrectly) estimate the RTT as, for example, 3 seconds, and again assuming the fastest method of computing the function F using a non-dedicated computation module requires more than twice the amount of time required by the dedicated computation module 112, then to assure that $T_{dedicated}+RTT<T_{non-dedicated}$ the computation parameters may be selected such that computations using dedicated computation module 112 would be faster than that using non-dedicated computation module by at least 3 seconds. Therefore, the computation parameter may be selected such that computations using dedicated computation module 112 may need 3 seconds and using a non-dedicated computation module may need more than 6 seconds. Accordingly, the server 102 may be configured to expect to receive the result in 6 seconds (e.g., 3 seconds (for data transmission)+3 seconds (for data computations)), while the emulator using a non-dedicated computation module can only be able to provide results at best in 7 seconds: 1 second (for data transmission)+(more than) 6 seconds (for data computations), and thus, will still be detected as a non-trusted device.

Then the process 300 may proceed to block 308, at which the process 200 (e.g., blocks 202 through 218 of the process 200 described with respect to FIG. 2) may be performed with the computation parameters generated at block 306.

It some embodiments, the server 102 may preliminarily estimate the RTT based on pre-existing estimates of RTTs between the two devices (for instance, on RTTs observed during establishing a TCP connection with the client device 110); select parameters for the function F based on this preliminary estimation; and proceed to block 308, at which the process 200 (e.g., blocks 202 through 218 of the process 200 described with respect to FIG. 2) may be performed with the selected parameters. If, as a result, the client device 110 is successfully attested, no further steps may be necessary. Otherwise, if the process 200 fails, this may be a result of incorrectly determined RTT and the server 102 may start over from the block 304 as described above.

In other embodiments, the amount of work (e.g., the value of N) may not be explicitly specified in the request sent to the client device 110. Instead, the client device 110 may itself select the amount of work to be performed, and send the amount of work performed (e.g., the value of N) together with the result of computation to the server 102. The amount of work may be selected so that it would be evident that only a client device 110 with a dedicated computation module 112 may perform this work during the time actually spent for the computation and sending the result. For example, the client device 110 may base this selection on the RTTs observed during establishing a TCP connection with the server 102. When the server 102 receives the result of computation together with an indication of the amount of work (e.g., the value of N), it may check whether only a client device 110 with a dedicated computation module 112 may perform this work during the time since the request has been sent. If this check is passed successfully, the server 102 may determine that the attestation has been passed successfully. If the check fails, the server 102 may additionally try to perform one or more of the processes described above.

Figure 4:
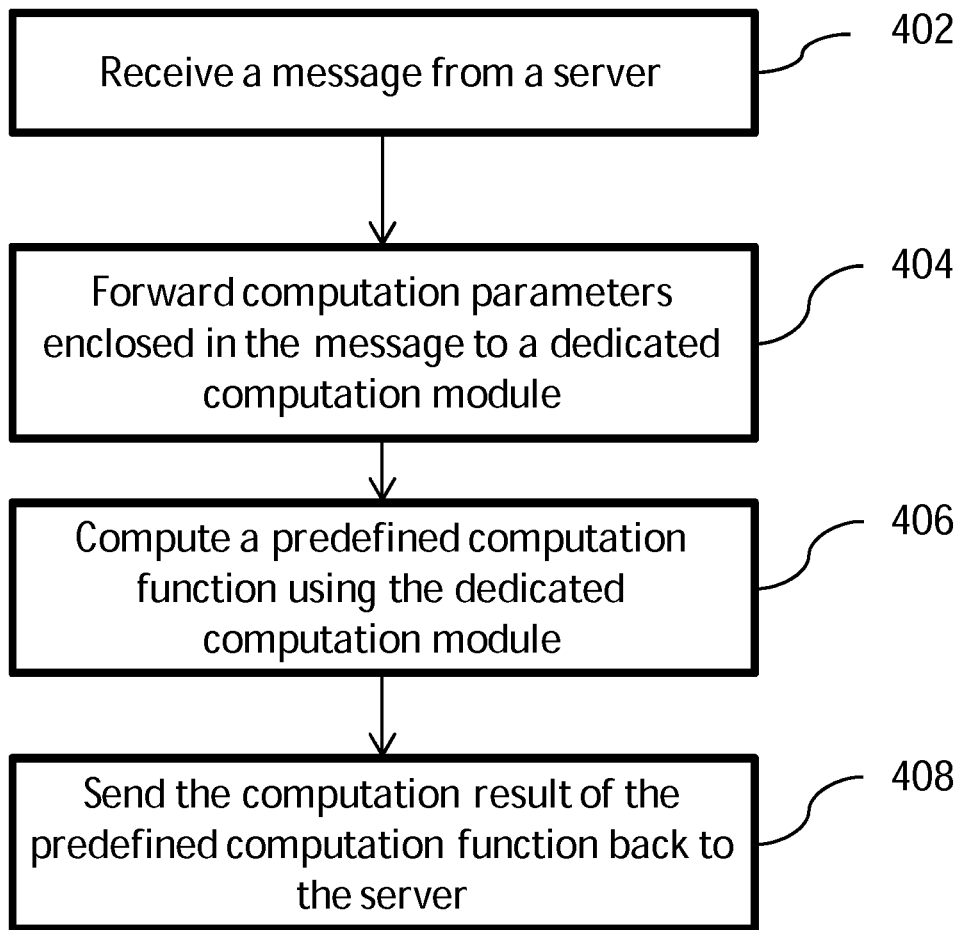
FIG. 4 is a flow diagram illustrating an exemplary process for a communication partner to be attested according to the present disclosure.

FIG. 4 is a flow diagram illustrating an exemplary process 400 for a communication partner (e.g., the computing device 110) to be attested according to the present disclosure. At block 402, a message may be received by the communication partner, for example, by the computing device 110 from the server 102. The message may include computation parameters, for example, an initial value (e.g., to be hashed or encrypted based on a predetermined algorithm), and optionally a number N for the number of repetitive calculations to be performed. In addition, in some embodiments, if the calculation to be performed is symmetric encryption, a symmetric encryption key may also be received. Further, in some embodiments, other parameters (depending on the nature of the function F) may also be included in the message.

Then the process 400 may proceed to block 404, at which the computation parameters enclosed in the message may be forwarded to a dedicated computation module. The dedicated computation module (e.g., the dedicated computation module 112) may have a fast computation speed, and as described above, the computation parameters may be selected such that the computation time for any non-dedicated computation module will be longer than (or at least as much as) the total amount of the computation time using the dedicated computation module and the time for back and forth data transmission.

At block 406, a predetermined computation may be performed using the dedicated computation module. As described above, the predetermined computation may be, for example, a predetermined hash function H, or a symmetric encryption function E, or a predetermined number of iterations of the hash function H or symmetric encryption function E. At block 408, the computation result of the predetermined computation function may be sent back to the server. For example, the predetermined computation may be performed by the dedicated computation module 112 and the result may be sent back to the server 102 for verification.

It should be noted that in certain embodiments, the computation parameters sent from the sever may indicate which predetermined function should be used. That is, in these embodiments, the server and computing device may have a group of predetermined functions to choose from (e.g., hash functions F1, F2, F3, etc., encryption functions E1, E2, E3, etc.) and the computation parameters generated at blocks 204 and 306 may include a parameter to select one specific function for computation. In one non-limiting embodiment, different functions of the group may require different amounts of time for computation and thus, the parameter to select one specific function for computation may be one of the parameters determined at block 306.

In some embodiments, a variation of the processes described above may be used. In such embodiments, a client device 110 may send to the server 102 not only the final result of computation of the function F but also some intermediate results. For example, in the case of a sequential computation, each $K^{th}$ intermediate result may be sent (e.g., if N=100 for 100 rounds of computations to be performed, the intermediate results after the $25^{th}$, $50^{th}$, and $75^{th}$ round may additionally be sent to the server 102). K may be, for example, a pre-defined value, or may be a value sent from server 102 to the device 110. Such intermediate results may be used by the server 102 to perform certain computations for the verification of the intermediate results received. For example, in the above example, the server 102 may do the first 25 rounds with the initial value to check that the intermediate result corresponding to the $25^{th}$ round received from the client device 110 is correct. The server 102 may do another 25 rounds with the intermediate result of the $25^{th}$ round received from the client device 110 to check that the next intermediate result received from the client device 110 corresponding to the $50^{th}$ round is correct; and so on. If any of such checks fails, the server 102 may determine that the whole process has failed; and, if each of such checks are successful, the whole process is passed. In some embodiments, the server 102 may perform checks on the results (four in the above example for $25^{th}$, $50^{th}$, $75^{th}$ and final) in parallel, which may correspondingly reduce overall time necessary for the whole check. For example, this technique may be used to reduce the overall time required for the whole check on a server that has highly parallelized computational engine(s), such as GPU(s).

In some embodiments, the attestation processes 200 or 300 may be combined with other ways of device attestation (either known in the art or developed in the future). For example, in one embodiment, for a certain device, both traditional device attestation (based on the private key embedded into the device), and the attestation processes 200 or 300 may be performed. In some embodiments, both traditional device attestation and attestation process 200 or 300 may be performed over the same SSL/TLS communication channel. This may provide significant improvement over traditional attestation methods, increasing the complexity of attacks required to circumvent attestation. As described above, to circumvent traditional attestation, an attacker only needs to extract the private key of the device, and then use any kind of software emulator. In contrast, if both the traditional attestation and attestation processes 200 or 300 are performed, to circumvent attestation, an attacker may need not only to extract the device private key, but also to produce a device able of performing computations fast enough. Producing such a device, however, may be very expensive and/or very difficult.

In some embodiments, as described above, an attestation process according to the present disclosure may use connection-based communication. In some other embodiments, the attestation process described above may also be applied to message-based (connectionless) communication.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (Soc)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A computer-implemented method comprising:
   receiving, from a server via a communication port of a computer, an attestation request, wherein the attestation request includes a nonce generated at the server;
   determining, by the computer, that a computer program being executed by a processor of the computer is digitally signed by a trusted third-party;
   executing, by the computer, an attestation instruction executable by the processor responsive to the determination that the computer program being executed by the processor is digitally signed by the trusted third-party, wherein the attestation instruction instructs the computer to perform an attestation process, and wherein access to the attestation instruction is restricted to programs signed by the third-party;
   generating, by the processor when executing the attestation instruction, a verification value, wherein the verification value is a computation result of a predefined function taking the nonce as an initial value; and
   sending, by the computer, the verification value to the server via the communication port.

2. The method of claim 1, further comprising obtaining, by the computer, a round-trip time for communication between the computer and the server.

3. The method of claim 2, further comprising selecting, by the computer, at least one computation parameter for generating the verification value based on the round-trip time.

4. The method of claim 3, wherein the at least one computation parameter includes a number of iterations for the particular predefined function to be performed by the computer.

5. The method of claim 1, wherein the predefined function comprises at least one of an encryption function and a cryptographic hash function.

6. The method of claim 1, further comprising capturing, by the computer, additional data comprising at least one intermediate result of computation of the predefined function.

7. The method of claim 6, wherein the predefined function includes a sequence of operations performed in series, and wherein an output of a previous step in the sequence is an input of a next step in the sequence.

8. The method of claim 7, wherein the at least one intermediate result comprises a first intermediate result of a first operation in the sequence of operations and a second intermediate result of a second operation in the sequence of operations.

9. The method of claim 7, further comprising obtaining, by the computer, from the attestation request a number of iterations for the sequence of operations.

10. The method of claim 9, wherein each step of the sequence of operations is an operation that starts its computation with all bits of an input value, and wherein all bits of its computation result are obtained simultaneously.

11. The method of claim 7, wherein the sequence of operations includes cryptographic hash functions and/or encryption functions.

12. A computing device comprising:
    a communication port configured to communicate data with a server; and
    a processor configured to:
       receive an attestation request from a server via the communication port, wherein the attestation request includes a nonce generated at the server;
       determine that a computer program being executed by a processor of the computer is digitally signed by a trusted third-party;
       execute an attestation instruction responsive to the determination that the computer program being executed by the processor is digitally signed by the trusted third-party, wherein the attestation instruction instructs the processor to perform an attestation process, and wherein access to the attestation instruction is restricted to programs signed by the third-party;
       generate a verification value, wherein the processor is programmed to generate the verification value when executing the attestation instruction, and wherein the verification value is a computation result of a predefined function taking the nonce as an initial value; and
       send the verification value to the server via the communication port.

13. The computing device of claim 12, wherein the processor is further configured to obtain a round-trip time for communication between the computing device and the server.

14. The computing device of claim 13, wherein the processor is further configured to select at least one computation parameter for generating the verification value based on the round-trip time.

15. The computing device of claim 14, wherein the at least one computation parameter includes a number of iterations for the particular predefined function to be performed by the computer.

16. The computing device of claim 12, wherein the predefined function is at least one of an encryption function and a cryptographic hash function.

17. The computing device of claim 12, wherein the processor is further configured to capture additional data comprising at least one intermediate result of computation of the predefined function.

18. The computing device of claim 17, wherein the predefined function includes a sequence of operations performed in series, and wherein an output of a previous step in the sequence is an input of a next step in the sequence.

19. The computing device of claim 18, wherein the at least one intermediate result comprises a first intermediate result of a first operation in the sequence of operations and a second intermediate result of a second operation in the sequence of operations.

20. The computing device of claim 18, wherein the processor is further configured to obtain from the attestation request a number of iterations for the sequence of operations.

21. The computing device of claim 20, wherein each step of the sequence of operations is an operation that starts its computation with all bits of an input value, and wherein all bits of its computation result are obtained simultaneously.

22. The computing device of claim 18, wherein the sequence of operations includes cryptographic hash functions and/or encryption functions.

* * * * *